United States Patent [19]

Busacchi

[11] Patent Number: 4,627,596
[45] Date of Patent: Dec. 9, 1986

[54] ELECTROMAGNETICALLY-CONTROLLED VALVE, SUITABLE FOR CONTROLLING AN ADDITIONAL AIR FLOW IN A FEED EQUIPMENT FOR AN INTERNAL COMBUSTION ENGINE

[75] Inventor: Pietro Busacchi, Bologna, Italy
[73] Assignee: Weber S.p.A., Toruio, Italy
[21] Appl. No.: 783,817
[22] Filed: Oct. 7, 1985

Related U.S. Application Data

[63] Continuation of Ser. No. 600,451, Apr. 16, 1984, abandoned.

[51] Int. Cl.$^4$ .............................................. F16K 31/02
[52] U.S. Cl. ............................ 251/129.07; 251/129.08; 251/282
[58] Field of Search .................. 251/129.01, 129.07, 251/129.08, 129.15, 282; 137/242

[56] References Cited

U.S. PATENT DOCUMENTS

| | | | |
|---|---|---|---|
| 2,732,172 | 1/1956 | Curran | 251/282 |
| 3,125,321 | 3/1964 | Domelen | 251/139 |
| 3,572,382 | 3/1971 | Luthe | 251/282 |
| 3,670,768 | 6/1972 | Griswold | 251/141 |

FOREIGN PATENT DOCUMENTS

| | | | |
|---|---|---|---|
| 214731 | 9/1960 | Austria | 251/282 |
| 850833 | 7/1952 | Fed. Rep. of Germany | 251/282 |
| 2361966 | 6/1975 | Fed. Rep. of Germany | 251/282 |

*Primary Examiner*—Randall L. Green
*Assistant Examiner*—Noah Kamen
*Attorney, Agent, or Firm*—Stevens, Davis, Miller & Mosher

[57] ABSTRACT

A valve includes an air inlet for air coming from a first part of an engine intake passage, which is positioned upstream of a throttle valve and an air outlet for air moving toward a second part of the intake passage which is positioned downstream of the throttle valve. A hollow tubular element is connected to the air inlet and has primary connecting orifices between the air inlet and the air outlet. A movable obturator is housed within the tubular element. A magnetic core and winding is energized by an electrical control unit to generate a magnetic field to move a conical edge of the obturator to selectively open the primary connecting orifices to obtain laminar air flow across the primary connecting orifices, with this laminar air flow being directly proportional to the air passage section provided by the opened primary connecting orifices.

4 Claims, 2 Drawing Figures

ELECTROMAGNETICALLY-CONTROLLED VALVE, SUITABLE FOR CONTROLLING AN ADDITIONAL AIR FLOW IN A FEED EQUIPMENT FOR AN INTERNAL COMBUSTION ENGINE

This application is a continuation of application Ser. No. 600,451, filed Apr. 16, 1984, now abandoned.

BACKGROUND OF THE INVENTION

1. Field of the Invention

The invention relates to an electromagnetically-controlled valve to control an additional air amount for intervening opportunity on the amount of the fuel air mixture delivered by feed equipment of an internal combustion engine. More particularly, this invention relates to a valve of the above-mentioned type which controls a connecting pipe disposed between two zones of an intake passage. These zones are positioned upstream and downstream of a throttle valve respectively, in order to obtain an additional air flow determined according to the requirements of the operating engine.

2. Description of the Prior Art

Generally, devices are known which control additional air flow between the various parts of the feed equipment and which are placed upstream and downstream of the throttle valve. Such devices provide a by-pass channel interconnecting a part of the intake passage located upstream of the throttle valve, with a part of the intake passage located downstream of the throttle valve. Also, in the by-pass channel there is a device to control the air flow, like a fixed section housing or an adjustable section bushing, by a conic drill of an adjusting screw.

In such devices, it is impossible to vary the controlling bushing section during operation of the engine in order to adapt the additional air flow to the working requirements of the engine itself.

SUMMARY OF THE INVENTION

The object of this invention is to avoid the problems and limitations of the above type of device. The valve according to this invention is inserted into a by-pass channel interconnecting a zone in the intake passage located upstream of the throttle valve with a zone in the intake passage located downstream of the throttle valve. The valve according to the present invention can vary the passage section of orifices connecting the first and second zones and also the additional air flow, in accordance with the engine's functioning requirements. Therefore, this invention provides a solution to a long-standing technical problem by producing an electromagnetically-controlled valve, including a obturator suitable to vary the passage section of fixed openings.

The advantages flowing from this invention are essentially the above-mentioned capacity to control the additional air amount while the engine is working; avoidance of appreciable pressure differentials in the various valve compartments; and providing a valve obturator which is an integeral part of the magnetic circuit, and in which the moving ferromagnetic element is housed. This ferromagnetic element is attracted to the fixed element against the bias of a constrast spring.

Such a structure lends itself to provision of numberless balance positions of the obturator in respect to the fixed openings to obtain passage sections having the required area to meet the operating conditions of the engine, by varying the pickup current value of the magnetic winding.

BRIEF DESCRIPTION OF THE DRAWINGS

There is illustrated in the attached drawings, presently preferred embodiments of the present invention wherein like numerals refer to like elements and wherein.

DETAILED DESCRIPTION OF THE INVENTION

Figure 1:
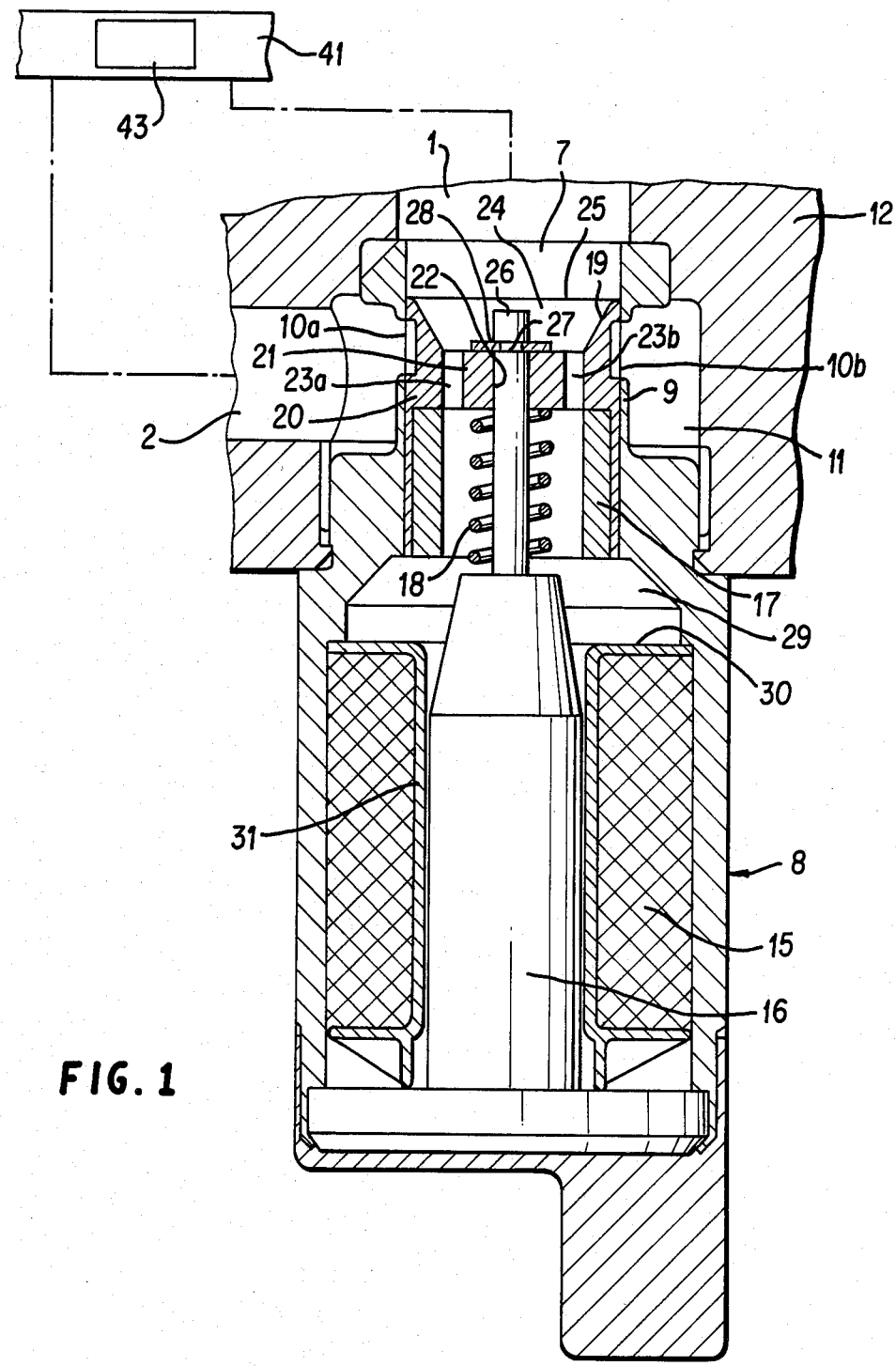
FIG. 1 is a cross-sectional view of a valve mechanism embodying principles of the present invention, in which an obturator element is in a first position.
Figure 2:
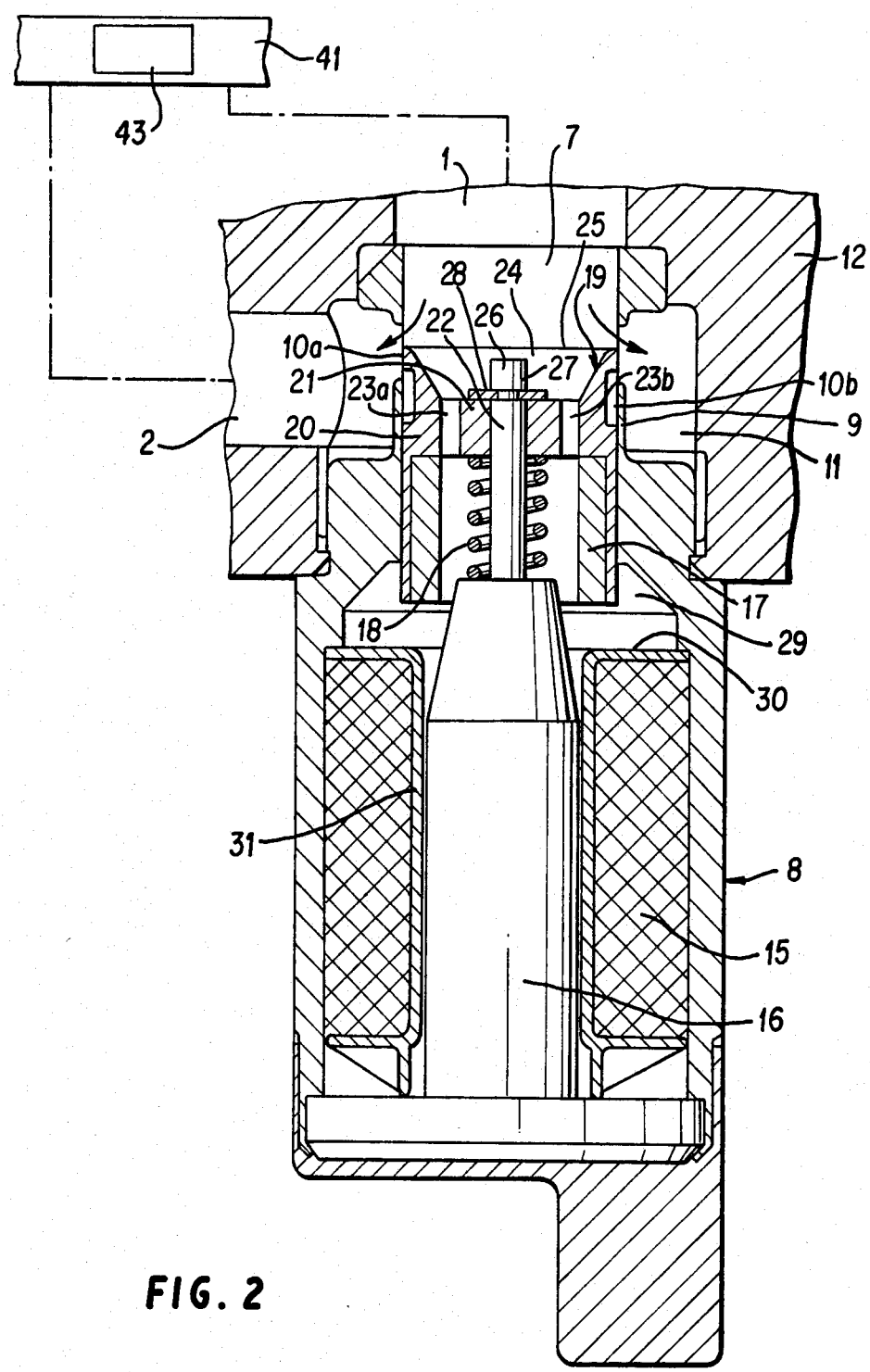
FIG. 2 is a cross-sectional view of a valve mechanism embodying principles of the present invention, in which an obturator element is in a second position.

The valve shown in FIGS. 1 and 2 is located in a pipe which joins a first orifice to a second one, made in an intake passage 41 of an internal combustion engine, located respectively upstream and downstream of a throttle valve 43.

This valve presents a body globally indicated with 8, provided with an inlet 7 for the above-mentioned pipe and connected to the first orifice through a channel 1. Inlet 7 is situated at the end of a tubular element 9, integral with body 8; in element 9, there are two primary connecting orifices 10a and 10b diametrically opposed and suitable to connect the internal part of tubular element 9 with a chamber 11, defined by the external surface of element 9 and by the internal surface of a sleeve 12 which joins the pipe, not shown, to body 8 and which is joined in the second orifice, not shown, by a channel 2. In this way, an air connection is provided between the orifice on the upstream and the one one the downstream of the throttle. In said connection, body 8 is inserted to control the air flow by varying the passage section of orifices 10a and 10b.

For this last purpose, body 8 includes, in addition to the sleeve 12 and to well-known means, neither described nor represented, for its stable positioning with respect to the intake passage, a magnetic winding 15 which receives current from an electrical control unit (not shown), a core 16 of low magnetic hysteresis material, and a movable keeper 17 made of low magnetic hysteresis material. Keeper 17 is moved by the magnetic field generated. Winding 15 is energized against the bias of a return spring 18 placed between core 16 and keeper 17. Keeper 17 is part of a movable obturator 19, made up of a bushing 20 of non-magnetic material (aluminum) which is able to slide inside tubular element 9. Bushing 20 includes a housing for keeper 17, this housing being integral with the internal part of obturator 19; an upper part 21 with a central orifice 22 and four eccentric orifices, of which orifices 23a and 23b are shown in FIGS. 1 and 2, and which connect inlet 7 with a cavity 29 inside body 8. On the upper part of bushing 20 there is a frusto-conical-shaped cavity 24, suitable to form a sharp edge 25 on its end.

Central orifice 22 is crossed by a pin 26 integral with core 16. Pin 26 presents a groove 27 to lodge a ring 28 which serves as a first support that carries out the upper end stroke for obturator 19, as the lower stroke end is made up of a shoulder 30 of a container 31 of said winding 15.

This special structure provides the following advantages: (a) a balance is provided between the pressures existing in inlet 7 and in cavity 29, so that the obturator is not subject to axial thrusts due to the pressure forces acting on two surfaces with equivalent areas, placed in front of the inlet 7 and the cavity 29 respectively; (b) the magnetic adhesive or attraction force of the keeper 17 is controlled or limited due to the presence of the non-magnetic material, with a defined thickness forming the bushing 20; (c) the positioning of edge 25 with respect to openings 10a and 10b is accomplished by controlling the intensity of the current which energizes winding 15; such positioning varies the sections for the air flow passages from inlet 7 to chamber 11 to regulate the air flow amount in accordance with the engine's operating conditions, which are sensed by the electrical control unit which also determines the air-fuel mixture requirements of the engine during all operational conditions; and (d) lamination of the air flow due to sharp edge 25 finally makes it possible to proportion the additional air flow to the uncovered opening with parities of difference in pressure between the areas upstream and downstream of the obturator.

The above description and accompanying drawings are merely illustrative of one embodiment of the present invention and are not limiting. Numerous other arrangements which embody the principles of the invention and which fall within its spirit and scope may be readily devised by those skilled in the art. Accordingly, the invention is not limited by the foregoing description, but only by the scope of the appended claims.

I claim:

1. An electromagnetically controlled valve for controlling additional air flow delivered by feed equipment associated with an internal combustion engine, said feed equipment including at least an engine intake passage and a throttle valve disposed in said passage, said electromagnetically controlled valve comprising:
    an air inlet for air coming from a first part of the intake passage, said air inlet being positioned upstream of said throttle valve;
    an air outlet for air moving toward a second part of the intake passage, said air outlet being positioned downstream of the throttle valve;
    a hollow tubular element connected to said air inlet and having primary connecting orifices between said air inlet and said air outlet;
    a movable obturator housed within said tubular element, said obturator comprising a bushing of non-magnetic material and a magnetic keeper housed within said bushing, said obturator being slidable within said tubular element;
    first and second stopping means for stopping movement of said obturator at limit positions within said tubular element;
    magnetic field generating means for generating a magnetic field to move said obturator between said limit positions, said generating means including a core disposed in a winding energizable by electrical control means;
    a return spring means for biasing said obturator against said magnetic field;
    said first stopping means including a first support supported by said core;
    said bushing including a second support for said spring, said second support being disposed in said bushing;
    said bushing including secondary orifices to connect said air inlet with an internal part of said tubular element; and
    said obturator including a conical edge means positioned to selectively open said primary connecting orifices responsive to energization of said winding to obtain laminar air flow across said primary connecting orifices, said laminar air flow being directly proportional to an air passage section provided by said primary connecting orifices.

2. A valve according to claim 1, wherein said keeper is removably covered by said bushing.

3. A valve according to claim 1, wherein said bushing is formed of aluminum.

4. An electromagnetically controlled valve for controlling additional air flow delivered by feed equipment associated with an internal combustion engine, said feed equipment including at least an engine intake passage and a throttle valve disposed in said passage, said electromagnetically controlled valve comprising:
    an air inlet for air coming from a first part of the intake passage, said air inlet being positioned upstream of said throttle valve;
    an air outlet for air moving toward a second part of the intake passage, said air outlet being positioned downstream of the throttle valve;
    a hollow tubular element connected to said air inlet and having primary connecting orifices between said air inlet and said air outlet;
    a movable obturator housed within said tubular element;
    first and second stopping means for stopping movement of said obturator at limit positions within said tubular element;
    magnetic field generating means for generating a magnetic field to move said obturator between said limit positions, said generating means including a core disposed in a winding energizable by electrical control means;
    a return spring means for biasing said obturator against said magnetic field;
    said obturator including a movable keeper made of ferromagnetic material disposed in a bushing of non-magnetic material both for sliding within said tubular element;
    said housing including a second support for said spring, said second support being disposed in said bushing;
    said bushing including secondary orifices to connect said air inlet with an internal part of said tubular element;
    said obturator including a conical edge means positioned to selectively open said primary connecting orifices responsive to energization of said winding to obtain laminar air flow across said primary connecting orifices, said laminar air flow being directly proportional to an air passage section provided by said primary connecting orifices; and
    said first stopping means comprising a first support supported by a casing for said winding, and said second stopping means comprising an elastic ring disposed in a groove of a pin integral with said magnetic core, said ring being disposed on an opposite side of said bushing from a side of said bushing on which said spring means is disposed.

* * * * *